2,842,517

SILOXANE UNSATURATED POLYESTER RESINS AND METHOD OF PREPARATION

Leonard M. Shorr, Pittsburgh, Pa., assignor to Dow Corning Corporation, Midland, Mich., a corporation of Michigan No Drawing. Application March 7, 1955
Serial No. 492,733

7 Claims. (Cl. 260—45.4)

The present invention relates to novel organosiloxane unsaturated polyester resins.

Heretofore, silicone polyester resins have been made by the process of reacting an alkoxy silane, a chlorosilane, or a compound containing silicon bonded hydroxyls with an alkyd resin or with a polyhydric alcohol and a polycarboxylic acid. In all of these cases the organosilicon compound was connected to the organic portion of the molecule through a SiOC linkage. This linkage is inherently hydrolytically unstable although in the presently available commercial silicone alkyds the water resistance of the resins is sufficiently good for many uses. There are other applications where this is not the case. Consequently, there is a need for an organosilicon-alkyd type material in which the fundamental linkages are not so susceptible to water as the CoSi linkage.

Heretofore, organosilicon alkyd formulations have been designed primarily for coating compositions such as for paints, magnet wire enamels, electric varnishes and the like. These formulations are primarily built around glycerine and phthalic acid or its isomers. They may or may not contain fatty acid modifications. There has been little or nothing in the way of silicone-alkyds which are suitable for molding compositions.

It is the object of the present invention to prepare novel silicone polyester resins which show a maximum resistance to water, improved thermal stability and improved abrasion resistance without sacrificing other desirable properties of heretofore known polyester resins.

This invention relates to compositions containing (1) from .01 to 20 percent by weight of a siloxane of the formula $$XR_nSiO_{\frac{3-n}{2}}$$

in which X is of the group ZOR'— and (YOOC)$_a$R''— in which Z is hydrogen or acyl radicals, R' is a divalent saturated aliphatic or divalent saturated cycloaliphatic hydrocarbon radical in all of which the ZO— group is on at least the third carbon atom away from the silicon, Y is hydrogen or alkyl, R'' is a divalent or trivalent saturated aliphatic or cycloaliphatic hydrocarbon radical wherein each carbonyl group is attached to at least the third carbon atom away from the silicon atom, $a$ is an integer from 1 to 2, $n$ has a value from 0 to 2 inclusive and R is a monovalent hydrocarbon radical or halogenated monovalent radical free of aliphatic unsaturation which siloxane may contain up to 80 mol percent copolymerized siloxane units of the formula $$A_mSiO_{\frac{4-m}{2}}$$

in which A is a monovalent hydrocarbon radical, halogenated monovalent hydrocarbon radical and a halophenoxymethyl radical and m has an average value from .9 to 3 inclusive, (2) from 80 to 99.99 percent by weight of (a) a compound of the group dihydric alcohols and acyl esters thereof and (b) compounds of the group dicarboxylic acids, dicarboxylic acid anhydrides, and dicarboxylic acid esters, at least one molecular species in combined (a) and (b) containing aliphatic unsaturation and (3) up to 50 percent by weight of a vinylic solvent based on the combined weights of (1), (2), and (3).

In order to simplify further discussion of this invention the term "alcoholic group" designates both —OH and —O acyl groups in the organic alcohols and their esters respectively and the ZO— groups in the siloxane. The term "alcoholic compound" designates both the polyhydric alcohols and their esters. The term "acidic group" designates —COOH,

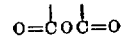

—COO alkyl groups in the organic compounds and —COOY groups in the siloxane. The term "acidic compound" includes carboxylic acids, their anhydrides and esters. Thus, the terms "alcoholic" and "acidic" include not only the specific compound or group referred to but to their known equivalents. The term "functional siloxane" designates siloxanes having X groups attached to the silicon atom.

The compositions of this invention are prepared in the conventional manner for preparing polyester resins namely, ingredients 1 and 2 are heated together preferably in an inert atmosphere until approximately the theoretical amount of by-product (that is water, acid, or alcohol) is removed. The resulting silicone modified polyester reaction product may then be employed as such for example, as a coating composition or it may be subsequently combined with a vinylic solvent and employed as a molding or casting resin.

In the preparation of the polyester resins the operation may be carried out either in one step or in two or more steps. That is the organosilicon compounds, the alcoholic compounds, and the acidic compounds may be reacted simultaneously. Alternatively, the alcoholic and the acidic compound may first be reacted under conditions where there is an excess of reactive groupings remaining and the siloxane then reacted with the residue.

The preparation of the compositions proceeds in essentially the same manner regardless of the kind of the functional group on the siloxane. One precaution which should be observed is that in those cases where the siloxane functional group is —R'O acyl, the by-product is an acid which must be neutralized during the condensation reaction so that it does not return to the reaction zone. This can be done quite readily by passing the refluxing material through an alkali trap.

It has been found that the best materials are obtained when the siloxane portion of the resin amounts to from .01 to 20 percent by weight of the total composition. Inferior products are obtained when the siloxane is present in amount greater than 20 percent by weight. The relative proportion of reactive groups in the reaction mixture can be varied considerably. It is best however, that the total number of alcoholic groups in the reaction mixture be approximately equal to the total number of acidic groups. Preferably there should be an excess of total alcoholic groups over total acidic groups. This excess may be as much as 20 percent.

The siloxanes employed in the materials of this invention can be any combination of siloxanes of the formula $$ZOR'R_nSiO_{\frac{3-n}{2}}$$

and any combination of siloxanes of the formula $$(YOOC)_aR''R_nSiO_{\frac{3-n}{2}}$$

The siloxane can also be any combination of these two types. That is, the siloxane can contain both alcoholic functional groups and acidic functional groups. In addition the siloxane portion can contain up to 80 mol percent siloxane units of the formula

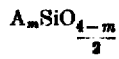

These units are copolymerized with the functional siloxane units. More specifically, therefore, the siloxanes of this invention may contain various combinations of the following type units: ZOR'SiO$_{3/2}$, ZOR'RSiO ZOR'R$_2$SiO$_{1/2}$, (YOOC)$_a$R"SiO$_{3/2}$, (YOOC)$_a$R"RSiO (YOOC)$_a$R"R$_2$SiO$_{1/2}$, ASiO$_{3/2}$, A$_2$SiO, A$_3$SiO$_{1/2}$, and SiO$_2$. Thus, it can be seen that the siloxanes employable in this invention can have an average of from 1 to 3 organic radicals per silicon atom and the various organic radicals on any one silicon atom can be the same or different.

Returning now to the functional siloxanes, it can be seen that this invention includes those of the type in which the functional groups are hydroxyl or alcoholic ester groups and in the latter Z can be any acyl radical such as acetyl, propionyl, butyryl, etc. R' can be any saturated divalent aliphatic hydrocarbon radical of at least three carbon atoms such as propylene, butylene, and octadecylene and any saturated cycloaliphatic divalent hydrocarbon radical of at least 4 carbon atoms such as

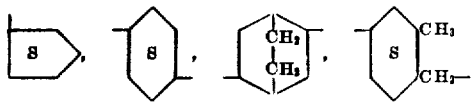

In those siloxanes which have acid functional groups, Y can be any alkyl radical such as methyl, ethyl, propyl, butyl, etc. R" can be any divalent saturated aliphatic hydrocarbon radical of at least 3 carbon atoms such as propylene, butylene, and octadecylene or any trivalent aliphatic hydrocarbon radical of at least 3 carbon atoms such as

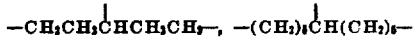
and

or any cyclic divalent aliphatic hydrocarbon radical of at least 5 carbon atoms such as cyclohexylene, cyclopentylene, methyl cyclohexylene and

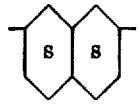

and any trivalent aliphatic saturated hydrocarbon radical of at least 6 carbon atoms such as

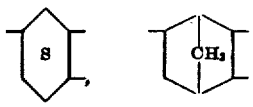

and

In the functional siloxanes R can be any monovalent hydrocarbon radical free of aliphatic unsaturation such as alkyl radicals such as methyl, ethyl, and octadecyl; cycloaliphatic radicals such as cyclohexyl and cyclopentyl; aryl hydrocarbon radicals such as phenyl, xenyl, naphthyl, and tolyl; and alkaryl hydrocarbon radicals such as benzyl and any halogenated monovalent hydrocarbon radical free of aliphatic unsaturation such as chlorophenyl, α,α,α-trifluorotolyl, bromoxenyl, tetrafluoroethyl, and tetrafluorocyclobutyl.

As has been shown these siloxanes may contain up to 80 mol percent copolymerized siloxane units in which A can be any monovalent hydrocarbon radical such as alkyl radicals such as ethyl, methyl, and octadecyl; alkenyl radicals such as vinyl, allyl, and hexenyl; cycloaliphatic hydrocarbon radicals such as cyclohexyl, cyclopentyl and cyclohexenyl; aromatic hydrocarbon radicals such as phenyl, xenyl, tolyl, and naphthyl; alkaryl hydrocarbon radicals such as benzyl; halophenoxymethyl radicals such as pentachlorophenoxymethyl, monochlorophenoxymethyl, 2-4-dichlorophenoxymethyl, 2-4-bromophenoxymethyl and pentabromophenoxymethyl; and halogenated monovalent hydrocarbon radicals such as chlorophenyl, bromoxenyl, α,α,α-trifluorotolyl, tetrachlorocyclobutyl, tetrafluoroethyl, and chlorodifluorovinyl.

Any dihydroxy alcohol or any ester of a dihydroxy alcohol, any dicarboxylic acid or dicarboxylic acid anhydride, and any ester of any dicarboxylic acid can be employed in the composition of this invention. However, there must be at least one unsaturated molecular species among the alcohols, acids, anhydrides, and esters employed. Thus, it can be seen that all of the alcoholic compounds may be unsaturated or all of the acidic compounds may be unsaturated or both may be unsaturated or only part of the alcoholic compound may be unsaturated or only part of the acidic compound may be unsaturated or part of both may be unsaturated. The amount of unsaturated alcoholic or acidic compound employed should be sufficient so that there is at least one unsaturated linkage per molecule of the finished product.

Specific examples of the polyhydric alcohols which may be employed in this invention are glycols such as ethylene glycol, diethylene glycol, triethylene glycol, propylene glycol, hexylene glycol, butanediol-1,4, isopropylidene bis-(p-phenyleneoxypropanol-2) and

together with the acetates, formates or propionates of such alcohols.

Specific examples of dibasic acids, dibasic acid anhydrides, and dibasic acid esters which are operative in this invention are maleic acid, fumaric acid, succinic acid, adipic acid, phthalic acid, tetrahydrophthalic acid, azelaic acid, malonic acid, tetrachlorophthalic acid, chlorendic acid, maleic anhydride, succinic anhydride, phthalic anhydride, tetrahydrophthalic anhydride, hexahydrophthalic anhydride, endomethylene tetrahydrophthalic anhydride, tetrachlorophthalic anhydride, dimethylterephthalate, dimethylisophthalate, diphenic acid, stilbenedicarboxylic acid, tolanedicarboxylic acid, and dibenzyl dicarboxylic acid.

If desired, the compositions of this invention may also contain limited amounts of monohydroxy alcohols and monocarboxylic acids or their equivalents in order to act as chain stoppers. They may also contain if desired, limited amounts of trihydroxy and tetrahydroxy alcohols or tricarboxylic acids in order to increase the functionality.

The condensation reaction products of the siloxane, the alcoholic compound, and the acidic compound are thermoplastic materials which may be employed as such in the manufacture of molded articles or as coating compositions. They may be thermoset by incorporating therein catalysts which will activate the aliphatic double bonds in the unsaturated alcoholic or acidic compounds thereby producing a cross linking of the materials. This cross linking can be facilitated by including alkenyl groups or other unsaturated hydrocarbon groups in the siloxane. When these groups are present, they will tend to interact with the unsaturated groups in the alcoholic compounds and the acidic compounds to increase the cross linking. These cross linked compounds are especially adaptable for making non-deformable molded articles and improved coating compositions.

The utility of the siloxane-alcoholic-acidic condensation products is increased by dissolving them in a vinylic solvent. Such solutions have lower viscosities than the original resin and can be employed in making cast articles or impregnating complicated equipment. Furthermore, the incorporation of vinylic solvent allows the compound to be set at lower temperatures thereby making room temperature molding and impregnating operations practical. For the purpose of this invention, up to 50 percent by weight of the vinylic solvent may be included in the compositions of this invention. This weight is based upon the total weight of the final product. The presence of the vinylic compound strengthens the compositions of this invention due to the introduction of more cross linking brought about by the reaction of the vinylic compound with the aliphatic unsaturated linkages in the siloxane polyester composition.

Thus, it can be seen that the reaction products of this invention are held together by C—C, Si—C and organic ester linkages and are free of the hydrolytically unstable SiOC linkage. This makes these compounds inherently more stable than heretofore employed silicone polyester resins.

Any vinylic compound which is compatible with the polyesters can be employed in this invention. Specific examples of such compounds are styrene, vinyltoluene, divinylbenzene, vinylacetate, methyl methacrylate, isoprene, butadiene, chloroprene, diallyl phthalate or other diallyl esters of dicarboxylic acids, triallyl cyanurate, diallyl diglycol carbonate, diallyl benzene phosphate, methacrylate esters of glycols such as the methyl methacrylate ester of ethylene glycol, vinylchloride, vinylidene chloride, allyl alcohol, and acrylonitrile.

From the above examples of suitable compounds, it can be seen that by "vinylic compound" is meant any liquid organic compound containing the

radical, i. e., a vinyl group or substituted vinyl group in what must obviously be a terminal position. As is shown above, the vinyl group or substituted vinyl group can be attached to any other substituents as long as the resulting compound is one which is compatible with the polyesters which form the other portion of the composition of this invention. The term "vinylic compound" is employed to stress the fact that, other than the compatibility limitation just mentioned, it is only the presence of the terminal vinyl type radical which is controlling here. The most preferred vinylic compound employed herein is styrene, which is of course a vinyl group attached to a benzene ring. Within the compatibility limitation noted, however, the vinyl radical can be attached to a host of other substituents, e. g., to chlorine as in vinyl chloride, to oxygen as in vinyl acetate and the various other esters mentioned above, to a cyanide radical as in acrylonitrile; or to carbon atoms which are themselves attached to other substituents, as in the methacrylates and the various allyl derivatives described above, or where the remainder of the molecule is nothing more than a hydrocarbon residue as in isoprene. It is also possible for two of the vinyl groups to be present in a molecule as in the chloroprene, butadiene, and diallyl compounds illustrated above.

The compositions of this invention may be cured by heat alone. Preferably, however, they are cured at room temperature in the presence of free radical catalysts such as aromatic acyl proxides, azo compounds or metal salts of carboxylic acids such as cobalt octoate, hexoate or naphthenate. Any catalyst normally employed for polymerizing vinylic compounds is applicable.

If desired, the compositions of this invention may contain pigments and fillers such as silica, glass fibers, organic fabrics, and any other material which may be added to improve specific physical properties such as flexural strength, and dimensional stability of the molded compositions.

The compositions of this invention are useful as protective coatings, electrical insulation, molded structural members and other molded, laminated and cast articles.

The following examples are illustrative only and should not be construed as limiting the invention which is properly set forth in the appended claims.

*Example 1*

56 g. of diethylene glycol, 34.1 g. of ethylene glycol, and 23.1 g. of a copolymer composed of 30 mol percent phenylmethylsiloxane, 45 mol percent monophenylsiloxane, and 25 mol percent gammahydroxypropyl methylsiloxane, were mixed and heated to 80° C. under nitrogen while a mixture of 68.6 g. of maleic anhydride, 22.2 g. of phthalic anhydride, 21.9 g. of adipic acid were added with stirring. After the addition of the acidic compound was complete, the temperature was increased to 150° C. within one hour and then at a rate of 10° per hour until 200° C. was reached. At this point, 30 ml. of xylene was added and the solution heated at 210° C. until 90–95 percent of the expected water was removed. The mass was cooled to 180° C. and subjected to reduced pressure to remove the xylene. The mixture was then cooled to 100° C. and .001 percent by weight of t-butylcatechol was added. After the solution had cooled to 50° C., 88 g. of styrene was mixed therewith.

100 g. of the solution of polyestersiloxane resin in styrene was mixed with .5 g. of cobalt naphthenate containing 6 percent by weight cobalt and 1.5 g. of a 60 percent solution of methylethylketone peroxide in dimethylphthalate. The resin was cast into a bar and in 1 to 2 hours, it had set to a hard cured material. The resulting product was analyzed and found to contain 1.7 percent by weight silicon.

A polyester resin containing no silicone was made in an identical manner from the following materials:

68.6 g. maleic anhydride
22.2 g. phthalic anhydride
21.9 g. adipic acid
58.4 g. diethylene glycol
34.1 g. ethylene glycol The resulting polyester was mixed with 79.1 g. of styrene and then cast into a bar as shown above. This resin is hereinafter referred to as the basic polyester resin.

Heat stability tests were run and it was found that the silicone modified resin was more stable at 200° C. than the basic resin. Other properties of the two resins were compared as follows:

| Properties tested | Silicone modified resin | Basic polyester resin |
|---|---|---|
| 1. Percent shrinkage on curing | 7.27 | 7.46 |
| 2. Average weight loss,[1] g | .134 | .184 |
| 3. Rockwell hardness | R 98 | R 106 |
| 4. Flexural strength in p. s. i. | 9,300 | 10,600 |
| 5. Modulus of elasticity | .81×10⁵ | 1.18×10⁵ |
| 6. Percent elongation | 9.4 | 6.2 |
| 7. Viscosity in cs. at 26° C | 416 | 436 |

[1] The average weight loss is a measure of the abrasion resistance of the resin. It was determined on a Taber abraser using Section CS 17, wheels at 1,000 g. load. The weight loss is expressed as the average weight loss per 1,000 cycles.

*Example 2*

Employing the procedure of Example 1 a resin was prepared from 68.6 g. maleic anhydride, 22.2 g. of phthalic anhydride, 21.9 g. of adipic acid, 111.9 g. diethylene glycol, 22.3 g. of a copolymer of 50 mol percent monophenylsiloxane and 50 mol percent gamma-hydroxypropylmethylsiloxane, and 96.9 g. of styrene. This material was cast into a test bar as in Example 1 and the resulting cured resin had the following properties:

Abrasion resistance in weight loss per 1,000
cycles _____ g__  .110
Rockwell hardness_____ R–94–96
Flexural strength_____ p. s. i__  6300
Modulus of elasticity_____  $.9 \times 10^5$
Elongation _____ percent__  6.9

Example 3

Employing the procedure of Example 1 with the exception noted below, 68.6 g. of maleic anhydride, 7.4 g. of phthalic anhydride, 22.6 g. of benzoic acid anhydride, 21.9 g. of adipic acid, 53 g. of diethylene glycol, 34.1 g. of ethylene glycol and 16 g. of $$[\text{AcO}(CH_2)_3\overset{Me}{\underset{|}{Si}}O]_4$$

were reacted. The exception was that after the temperature had been raised to 200° C. as noted in Example 1, 30 cc. of xylene were added and the refluxing material was thereafter passed through an alkali trap to remove the acetic acid before the solvent was recycled.

After the material had cooled to 50° C., 85.2 g. of styrene were added and the solution was cast into a bar as in Example 1. The resulting product was tested and found to have the following properties:

Weight loss per 1,000 cycles_____ g__  .14
Rockwell hardness_____ R–64–69
Flexural strength_____ p. s. i__  4300
Modulus of elasticity_____  $.36 \times 10^5$
Elongation _____ percent__  8.1

Example 4

Using the procedure of Example 1 a resin was prepared by reacting the following ingredients: 68.6 g. of maleic anhydride, 16.7 g. of phthalic anhydride, 21.9 g. of adipic acid, 34.1 g. of ethylene glycol, 58.4 g. of diethylene glycol and 25.6 g. of a copolymer of 50 mol percent phenylmethylsiloxane and 50 mol percent

[structure: benzene ring with O$_{3/2}$Si— and —CH$_3$ and COOMe substituents]

During the reaction, the evolution of methyl alcohol was determined by the ceric nitrate test carried out on the distillate.

After the reaction material had been cooled to 50° C., 105.1 g. of styrene were added and the material was cast into a bar as in Example 1. The styrene solution had a viscosity of 168 cs. at 26° C. and the cured resin had the following properties:

Weight loss per 1,000 cycles _____ g__  .226
Shrinkage upon curing_____ percent__  8.26
Rockwell hardness_____ R–105
Flexural strength_____ p. s. i__  10,900
Modulus of elasticity_____  $2.2 \times 10^5$
Elongation _____ percent__  3.4

This resin was heated at 200° C. for 1300 hours without any apparent effect on its physical properties. By contrast the basic polyester resin disintegrated within 300 to 400 hours at 200° C.

Example 5

Using the method of Example 1, a resinous material was obtained by reacting 68.6 g. of maleic anhydride, 40.7 g. of benzoic acid anhydride, 17.5 g. of adipic acid, 48.8 g. of diethylene glycol, 34.1 g. of ethylene glycol, 44.5 g. of a copolymer of 50 mol percent monophenylsiloxane, and 50 mol percent gamma-hydroxypropylmethylsiloxane. The resulting product was dissolved in 79.1 g. of styrene and was molded into a test bar to give a tough resinous product.

Example 6

When 56 g. of diethylene glycol, 34.1 g. of ethylene glycol, 23.1 g. of a copolymer of 30 mol percent phenylmethylsiloxane, 43 mol percent monophenylsiloxane and 25 mol percent gamma-hydroxypropylmethylsiloxane, 68.6 g. of maleic anhydride, 22.2 g. of phthalic anhydride, and 21.9 g. of adapic acid is reacted in accordance with the method of Example 1 and thereafter mixed with a combination of benzoyl peroxide and cobalt naphthenate and heated to a temperature of 125° C., a thermosetting resinous material is obtained.

Example 7

When a copolymer of 25 mol percent chlorophenylmethylsiloxane, 25 mol percent α,α,α-trifluorotolylsiloxane, 15 mol percent vinylphenylsiloxane, 10 mol percent pentachlorophenoxymethylsiloxane (Cl$_5$C$_6$OCH$_2$SiO$_{3/2}$), 12.5 mol percent diphenylsiloxane and 12.5 mol percent

[structure: benzene ring with two HOOC groups and —Si(CH$_3$)(CH$_3$)O— substituents, labeled Me]

is employed in the process of Example 1, a resinous product is obtained.

Example 8

Equivalent results are obtained when the siloxane of the formula $$\text{HOOC}(CH_2)_{10}\overset{Ph}{\underset{|}{Si}}O$$

is employed in the procedure of Example 1.

That which is claimed is:

1. A composition of matter comprising the reaction product of (1) from .01 to 20 percent by weight of a siloxane of the formula $$XR_nSiO_{\frac{3-n}{2}}$$

in which X is of the group consisting of ZOR'— and (YOOC)$_a$R''— in which Z is selected from the group consisting of hydrogen and acyl radicals, R' is of the group consisting of divalent saturated aliphatic and divalent saturated cycloaliphatic hydrocarbon radicals, in all of which the ZO— group is on at least the third carbon atom away from the silicon, Y is selected from the group consisting of hydrogen and alkyl radicals, R'' is selected from the group consisting of divalent and trivalent saturated aliphatic hydrocarbon radicals and divalent and trivalent saturated cycloaliphatic hydrocarbon radicals, in all of which each carbonyl group is attached to at least the third carbon atom away from the silicon atom, $a$ is an integer from 1 to 2 inclusive, $n$ has a value from 0 to 2 inclusive, and R is selected from the group consisting of monovalent hydrocarbon radicals and halogenated monovalent hydrocarbon radicals all of which are free of aliphatic unsaturation, which siloxane may contain up to 80 mol percent copolymerized siloxane units of the formula $$A_mSiO_{\frac{4-m}{2}}$$

in which A is selected from the group consisting of monovalent hydrocarbon radicals, halogenated monovalent hydrocarbon radicals and halophenoxymethyl radicals and $m$ has an average value from .9 to 3 inclusive, and (2) from 80 to 99.99 percent by weight of ($a$) a compound of the group consisting of dihydric alcohols and acyl esters thereof formed from monocarboxylic acids, and ($b$) compounds containing only carbon, hydrogen, and oxygen atoms and selected from the group consisting of dicarboxylic acids, dicarboxylic acid anhydrides, and dicarboxylic acid esters, at least one molecular species in combined ($a$) and ($b$) containing aliphatic unsaturation, and the proportions of (a) and (b) being such that the total number of alcoholic groups in the reaction mixture ranges from a number substantially equal to the total number of acidic groups to a number 20 percent in excess of said total acidic groups, said reaction product being dissolved in (3) up to 50 percent by weight of a liquid vinylic compound based on the combined weights of (1), (2), and (3), said vinylic compound being compatible with the reaction product of (1) and (2).

2. A composition of matter comprising the reaction product of (1) from .01 to 20 percent by weight of a siloxane of the formula $$XR_nSiO_{\frac{3-n}{2}}$$

in which X is of the group consisting of ZOR'— and (YOOC)$_a$R"— in which Z is selected from the group consisting of hydrogen and acyl radicals, R' is of the group consisting of divalent saturated aliphatic and divalent saturated cycloaliphatic hydrocarbon radicals, in all of which the ZO— group is on at least the third carbon atom away from the silicon, Y is selected from the group consisting of hydrogen and alkyl radicals, R" is selected from the group consisting of divalent and trivalent saturated aliphatic hydrocarbon radicals and divalent and trivalent saturated cycloaliphatic hydrocarbon radicals, in all of which each carbonyl group is attached to at least the third carbon atom away from the silicon atom, $a$ is an integer from 1 to 2 inclusive, $n$ has a value from 0 to 2 inclusive, and R is selected from the group consisting of monovalent hydrocarbon radicals and halogenated monovalent hydrocarbon radicals all of which are free of aliphatic unsaturation, which siloxane may contain up to 80 mol percent copolymerized siloxane units of the formula $$A_mSiO_{\frac{4-m}{2}}$$

in which A is selected from the group consisting of monovalent hydrocarbon radicals, halogenated monovalent hydrocarbon radicals and halophenoxymethyl radicals and $m$ has an average value from .9 to 3 inclusive, and (2) from 80 to 99.99 percent by weight of (a) a compound of the group consisting of dihydric alcohols and acyl esters thereof formed from a monocarboxylic acid, and (b) compounds containing only carbon, hydrogen, and oxygen atoms and selected from the group consisting of dicarboxylic acid, dicarboxylic acid anhydrides, and dicarboxylic acid esters, at least one molecular species in combined (a) and (b) containing aliphatic unsaturation and the proportions of (a) and (b) being such that the total number of alcoholic groups in the reaction mixture ranges from a number substantially equal to the total number of acidic groups to a number 20 percent in excess of said total acidic groups, with (3) up to 50 percent by weight of a liquid vinylic compound other than those defined in (2) based on the combined weights of (1), (2), and (3), said vinylic compound being compatible with the reaction product of (1) and (2).

3. A composition of matter comprising the reaction product of (1) from .01 to 20 percent by weight of a siloxane consisting of gamma-hydroxypropylmethylsiloxane with up to 80 mol percent copolymerized methylphenylsiloxane having an average of from .9 to 3 inclusive total methyl and phenyl radicals per silicon atom, and (2) from 80 to 99.99 percent by weight of a dihydric alcohol and a dicarboxylic acidic compound each of which contain only carbon, hydrogen, and oxygen atoms, at least one molecular species in the alcoholic and the acidic compound containing aliphatic unsaturation, and the proportions of (a) and (b) being such that the total number of alcoholic groups in the reaction mixture ranges from a number substantially equal to the total number of acidic groups to a number 20 percent in excess of said total acidic groups, said reaction product being dissolved in up to (3) 50 percent by weight styrene, based on the combined weights of (1), (2), and (3).

4. A composition of matter comprising the reaction product of (1) from .01 to 20 percent by weight of a siloxane consisting of gamma-hydroxypropylmethylsiloxane with up to 80 mol percent copolymerized methylphenylsiloxane having an average of from .9 to 3 inclusive total methyl and phenyl radicals per silicon atom, and (2) from 80 to 99.99 percent by weight of a dihydric alcohol and a dicarboxylic acid compound each of which contains only carbon, hydrogen, and oxygen atoms, at least one molecular species in the alcoholic and the acidic compound containing aliphatic unsaturation and the proportions of (a) and (b) being such that the total number of alcoholic groups in the reaction mixture ranges from a number substantially equal to the total number of acidic groups to a number 20 percent in excess of said total acidic groups, with (3) up to 50 percent by weight styrene based on the combined weights of (1), (2), and (3).

5. A method for the preparation of organosiloxane unsaturated polyester resins comprising reacting (1) from .01 to 20 percent by weight of a siloxane of the formula $$XR_nSiO_{\frac{3-n}{2}}$$

in which X is of the group consisting of ZOR'— and (YOOC)$_a$R"— in which Z is selected from the group consisting of hydrogen and acyl radicals, R' is of the group consisting of divalent saturated aliphatic and divalent saturated cycloaliphatic hydrocarbon radicals, in all of which the ZO— group is on at least the third carbon atom away from the silicon, Y is selected from the group consisting of hydrogen and alkyl radicals, R" is selected from the group consisting of divalent and trivalent saturated aliphatic hydrocarbon radicals and divalent and trivalent saturated cycloaliphatic hydrocarbon radicals, in all of which each carbonyl group is attached to at least the third carbon atom away from the silicon atom, $a$ is an integer from 1 to 2 inclusive, $n$ has a value from 0 to 2 inclusive, and R is selected from the group consisting of monovalent hydrocarbon radicals and halogenated monovalent hydrocarbon radicals all of which are free of aliphatic unsaturation, which siloxane may contain up to 80 mol percent copolymerized siloxane units of the formula $$A_mSiO_{\frac{4-m}{2}}$$

in which A is selected from the group consisting of monovalent hydrocarbon radicals, halogenated monovalent hydrocarbon radicals and halophenoxymethyl radicals and $m$ has an average value from .9 to 3 inclusive, and (2) from 80 to 99.99 percent by weight of (a) a compound of the group consisting of dihydric alcohols and acyl esters thereof formed from monocarboxylic acids, and (b) compounds containing only carbon, hydrogen, and oxygen atoms and selected from the group consisting of dicarboxylic acids, dicarboxylic acid anhydrides, and dicarboxylic acid esters, at least one molecular species in combined (a) and (b) containing aliphatic unsaturation, and the proportions of (a) and (b) being such that the total number of alcoholic groups in the reaction mixture ranges from a number substantially equal to the total number of acidic groups to a number 20 percent in excess of said total acidic groups, by heating (1) and (2) together in liquid phase and removing substantially the theoretical amount of byproduct, then dissolving the reaction product obtained thereby in up to 50 percent by weight based on the total weight of the solution of a liquid vinylic compound compatible with said reaction product.

6. A method for the preparation of organosiloxane unsaturated polyester resins comprising reacting (1) from .01 to 20 percent by weight of a siloxane consisting of gamma-hydroxypropylmethylsiloxane with up to 80 mol percent copolymerized methylphenylsiloxane having an average of from .9 to 3 inclusive total methyl and phenyl radicals per silicon atom, and (2) from 80 to 99.99 percent by weight of a dihydric alcohol and a dicarboxylic acidic compound each of which contains only carbon, hydrogen, and oxygen atoms, at least one molecular species in the alcoholic and the acidic compound containing aliphatic unsaturation, and the proportions of (a) and (b) being such that the total number of alcoholic groups in the reaction mixture ranges from a number substantially equal to the total number of acidic groups to a number 20 percent in excess of said total acidic groups, by heating (1) and (2) together in liquid phase and removing substantially the theoretical amount of by-product, then dissolving the reaction product obtained thereby in up to 50 percent by weight of styrene based upon the total weight of the solution.

7. A composition of matter comprising the reaction product of (a) a siloxane consisting essentially of gamma-hydroxypropylmethylsiloxane units with up to 80 mol percent copolymerized siloxane units containing only methyl and phenyl radicals as the organic radicals attached to silicon at an average ratio of from 0.9 to 3 inclusive total methyl and phenyl radicals per silicon atom, (b) ethylene glycol and diethylene glycol, and (c) maleic anhydride, phthalic anhydride, and adipic acid, there being used from 0.01 to 20 percent by weight of (a) and from 80 to 99.99 percent of (b) plus (c) in the reaction mixture and there being sufficient of the maleic anhydride present to provide at least one unsaturated linkage per molecule of the said reaction product, the proportions of (a), (b), and (c) being such that the total number of alcoholic groups in (a) plus (b) ranges from a number substantially equal to the acidic groups in (c) to a number 20 percent in excess of said acidic groups, said reaction product being dissolved in (d) up to 50 percent by weight styrene based on the combined weights of (a), (b), (c), and (d).

References Cited in the file of this patent
UNITED STATES PATENTS

| | | |
|---|---|---|
| 2,661,348 | Welsh et al. | Dec. 1, 1953 |
| 2,686,739 | Kohl | Aug. 17, 1954 |

UNITED STATES PATENT OFFICE
CERTIFICATE OF CORRECTION

Patent No. 2,842,517                                                                July 8, 1958

Leonard M. Shorr

It is hereby certified that error appears in the printed specification of the above numbered patent requiring correction and that the said Letters Patent should read as corrected below.

Column 1, line 30, for "CoSi" read --COSi--; column 8, line 7, for "adapic" read --adipic--; column 10, line 12, for "acid" read --acidic--.

Signed and sealed this 7th day of October 1958.

(SEAL)
Attest:

KARL H. AXLINE                                              ROBERT C. WATSON
Attesting Officer                                          Commissioner of Patents